US011070471B1

(12) United States Patent
Chang

(10) Patent No.: US 11,070,471 B1
(45) Date of Patent: Jul. 20, 2021

(54) SWITCH FABRIC FOR NETWORKED VIRTUAL MACHINES

(71) Applicant: Paul Chang, Fullerton, CA (US)

(72) Inventor: Paul Chang, Fullerton, CA (US)

( * ) Notice: Subject to any disclaimer, the term of this patent is extended or adjusted under 35 U.S.C. 154(b) by 0 days.

(21) Appl. No.: 16/048,815

(22) Filed: Jul. 30, 2018

(51) Int. Cl.
  *H04L 12/741* (2013.01)
  *H04L 12/721* (2013.01)
  *H04L 12/46* (2006.01)
  *H04L 12/931* (2013.01)
  *H04L 12/947* (2013.01)

(52) U.S. Cl.
  CPC ........ *H04L 45/745* (2013.01); *H04L 12/4645* (2013.01); *H04L 45/66* (2013.01); *H04L 49/25* (2013.01); *H04L 49/354* (2013.01)

(58) Field of Classification Search
  CPC ....... H04L 45/745; H04L 45/66; H04L 49/25; H04L 49/354; H04L 12/4645
  See application file for complete search history.

(56) References Cited

U.S. PATENT DOCUMENTS

| | | | | |
|---|---|---|---|---|
| 2011/0268118 A1* | 11/2011 | Schlansker | ......... | H04L 12/4641 370/392 |
| 2014/0092901 A1* | 4/2014 | Kapadia | ................ | H04L 45/745 370/390 |
| 2014/0369345 A1* | 12/2014 | Yang | ........................ | H04L 12/18 370/355 |
| 2015/0063351 A1* | 3/2015 | Moreno | ................ | H04L 45/745 370/392 |
| 2015/0124826 A1* | 5/2015 | Edsall | ................ | H04L 12/4633 370/392 |
| 2015/0312134 A1* | 10/2015 | Kapadia | .................. | H04L 45/02 370/256 |
| 2016/0036774 A1* | 2/2016 | Chong | .................... | H04L 45/02 370/392 |
| 2016/0099834 A1* | 4/2016 | Kim | .................... | H04L 41/0803 370/256 |
| 2017/0346736 A1* | 11/2017 | Chander | ............... | H04L 45/745 |

OTHER PUBLICATIONS

Chen, C., Li, D., & Li, J. SVDC: A Highly Scalable Isolation Architecture for Virtualized Layer-2 Data Center Jun. 29, 2016. Networks, in IEEE Transactions on Cloud Computing, IEEE, DOI: 10.1109/TCC.2016.2586047, pp. 1178-1190.*

* cited by examiner

*Primary Examiner* — Ajit Patel
*Assistant Examiner* — Wilfred Thomas
(74) *Attorney, Agent, or Firm* — File-EE-Patents.com; Jay A. Chesavage

(57) ABSTRACT

A switch fabric has a plurality of leaf switches, each leaf switch having a local tenant identifier (LTID) table, a local forwarding information base (LFIB) table, and a forwarding engine coupled to the LTID table and LFIB table. Each leaf switch has downlink ports operative on VLAN packets such as those generated by Container/Virtual machines (CVM), each leaf switch also having a reconfigurable uplink port for transmission and reception of VxLAN packets formed from VLAN packets which have a destination address which is not local to a particular leaf switch. The uplink ports are coupled to the leaf ports of one or more spine switches, each spine switch having a Global Forward Information Base (GFIB) table slice coupled to a VxLAN forwarder which receives VxLAN packets, de-encapsulates them and uses the GFIB table slice to form new VxLAN packets transmitted to a different leaf port.

24 Claims, 10 Drawing Sheets

Prior Art Virtual Machine Routing

Leaf Switch Process
300

*Figure 3B*
Leaf Tenant ID (LTID) tables

340 | {port,VLAN_ID}->GTID

342 | {port,GTID}->VLAN_ID

*Figure 3C*
Leaf FIB (LFIB) table

352 | {GTID,MAC_addr}->DL_leaf_port

354 | {GTID,IP_addr}->
{DL_leaf_port,new_MAC_addr}

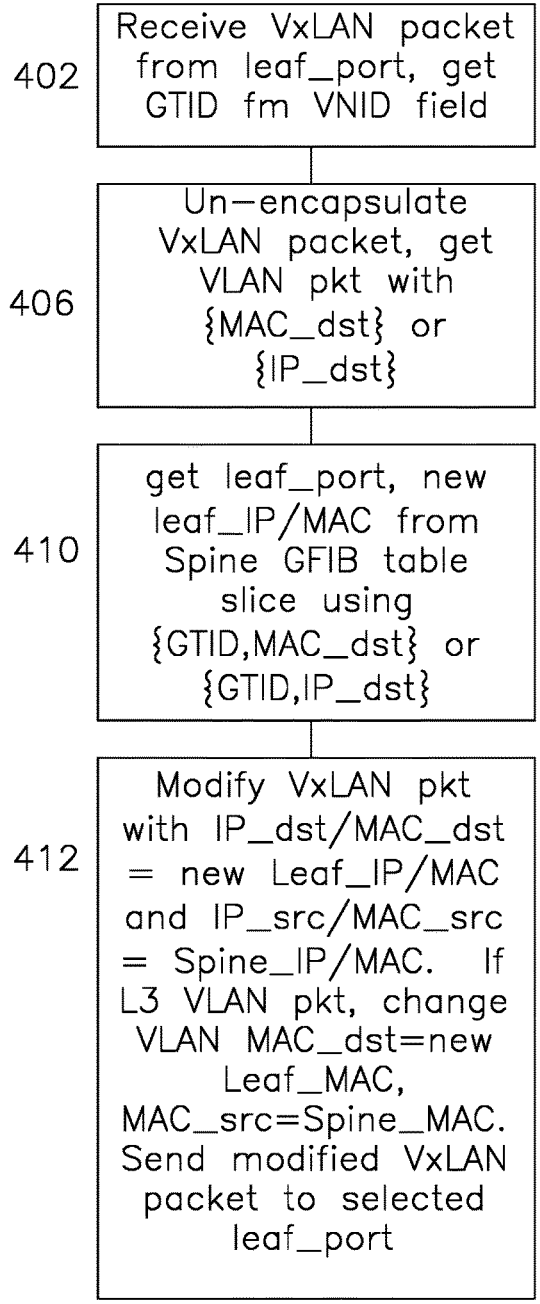

*Figure 4A*
Spine Switch Process
400

402 Receive VxLAN packet from leaf_port, get GTID fm VNID field

406 Un-encapsulate VxLAN packet, get VLAN pkt with {MAC_dst} or {IP_dst}

410 get leaf_port, new leaf_IP/MAC from Spine GFIB table slice using {GTID,MAC_dst} or {GTID,IP_dst}

412 Modify VxLAN pkt with IP_dst/MAC_dst = new Leaf_IP/MAC and IP_src/MAC_src = Spine_IP/MAC. If L3 VLAN pkt, change VLAN MAC_dst=new Leaf_MAC, MAC_src=Spine_MAC. Send modified VxLAN packet to selected leaf_port

*Figure 4B*
Spine GFIB table slice
442
{GTID,MAC_addr}-> leaf_port, leaf_MAC, Leaf_IP 444
{GTID,IP_addr}-> leaf_port,leaf_MAC,leaf_IP Leaf Switch Uplink and Downlink Process
500

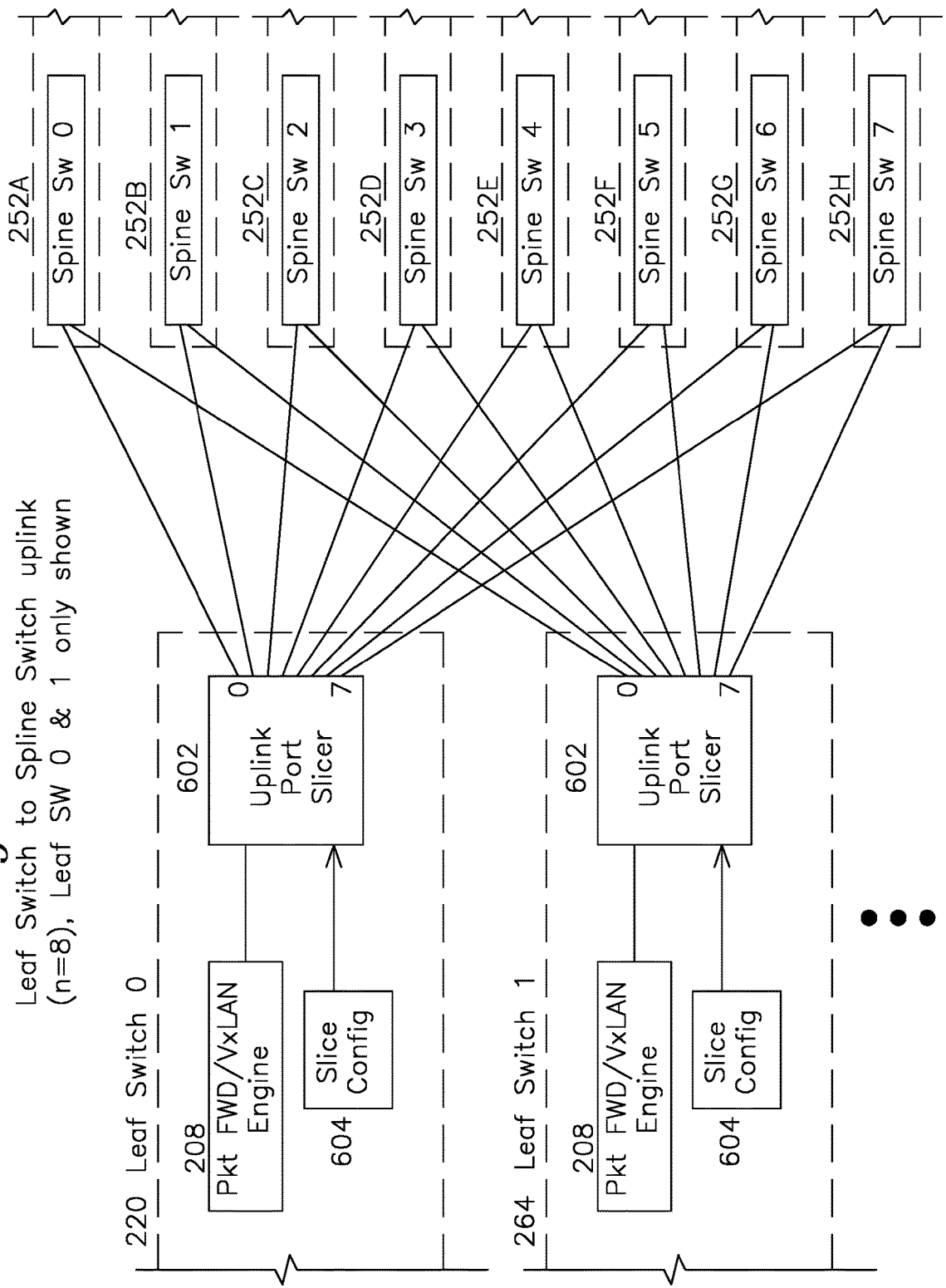

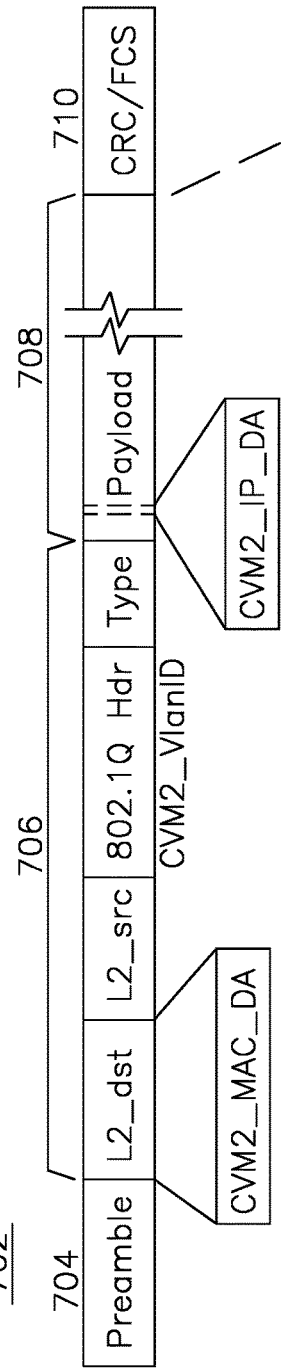
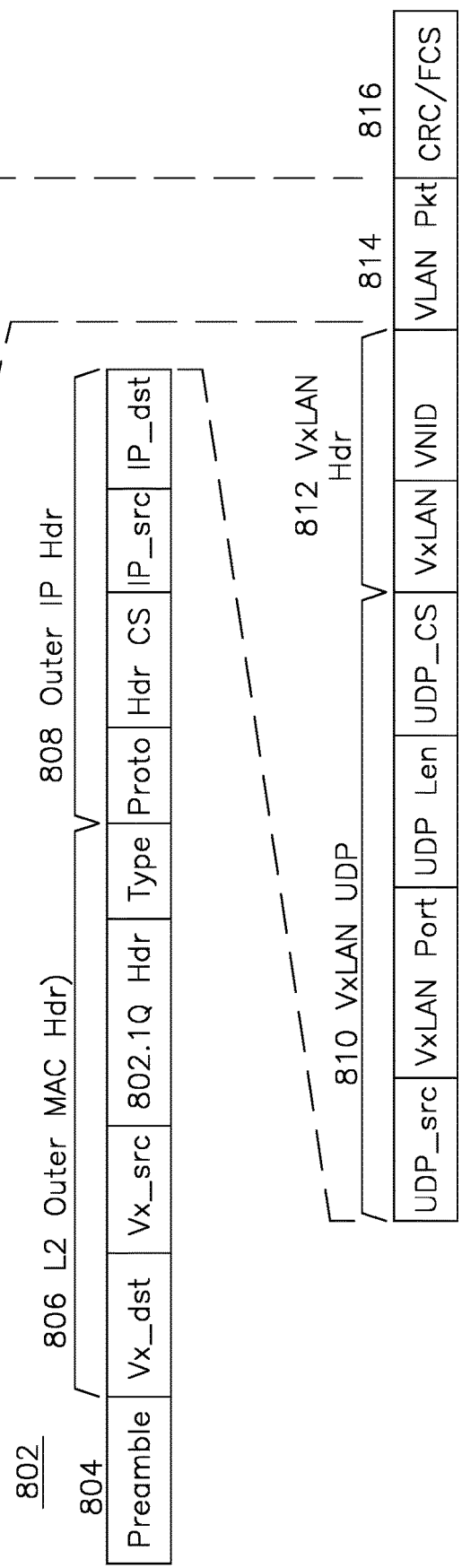

CVM1 -> CVM2 Switch Path using Layer 2 MAC Address

CVM1 -> CVM2 Switch Path using Layer 3

SWITCH FABRIC FOR NETWORKED VIRTUAL MACHINES

FIELD OF THE INVENTION

The present invention relates to a network switch for use in controlling network traffic in a high speed, densely populated network fabric.

BACKGROUND OF THE INVENTION

In the prior art for virtual computing, physical servers are connected to the internet using network switches which rely on routing of packets using the layer 2 MAC (Media Access Controller) address or layer 3 Internet Protocol (IP) address.

In the field of virtual computing, a single physical server may host a large number of container/virtual machines (CVM), each one a separate process running within the host, and with its own MAC or IP address, and associated network inputs and outputs (IOs) for information transferred through the network. Furthermore, CVMs may be assigned to different user groups or leased out to different tenants in the public cloud computing environment.

One type of network switching or routing uses the concept of a Virtual Local Area Network (VLAN) extension to IEEE 802.1, where the VLAN extension provides a 12 bit VLAN_ID which is used as an identification tag to partition one single physical LAN into multiple Virtual-LANs (VLAN) which can then provide unique addressing and access by multiple users or tenant groups and at the same time, provide information isolation between different user or tenant groups for the security and privacy concerns. The use of VLAN_ID has a maximum addressing limit of 4095 unique user or tenant groups in a network. As computing power has been increasing in the past decade, the number of virtual machines as well as the number of user or tenant groups in current cloud computing infrastructure has been growing and has already exceeded the maximum number of VLANs that the 12 bit VLAN_ID will support.

An extended VLAN scheme, called the VxLAN, and described in the IETF (Internet Engineering Task Force www.ietf.org) RFC publication number 7238, has been proposed that can extent the 12-bit VLAN_ID into 24-bit Extended-VLAN_ID and thus can now allow a network to support up to 16 millions concurrent user or tenant groups at any given time. Although VxLAN has resolved the VLAN scalability limitation through extended addressing, the prior art network switch fabric infrastructure remains incapable of supporting all the tens or hundreds millions of CVMs that may exist in the cloud data centers especially in mega public cloud data centers. The fundamental cause of the incapability of modern network switch structures to handle millions of concurrent packet streams to different address end points is that the basic structure of current switch systems and switch fabrics were not originally designed for handling communication between such a huge number of CVMs with millions of user or tenant groups concurrently communicating. It is highly desired to provide a new design structure and architecture for the switch systems and the network switch fabric such that, at any given time, any CVM can reach any other CVMs in each one of millions of tenants concurrently, while providing different Quality of Service (QoS) guarantees for different class of applications or tenant groups even in the world's largest public cloud data centers such as Amazon Web Services (AWS) and Google Cloud Platform.

OBJECTS OF THE INVENTION

A first object of the invention is a switch fabric for Container/Virtual Machines (CVM) where one or more spine switches are coupled to plurality of leaf switches through leaf switch uplink ports, each leaf switch coupled to a plurality of hosts through leaf switch downlink ports, where a request from a CVM in a host is directed to the leaf switch, where each leaf switch separately has a packet forwarding engine which is coupled to a Local Tenant IDentifier (LTID) table with entries associating between VLAN_ID and downlink port to a Global Tenant IDentifier (GTID), the forwarding engine also coupled to a Local Forwarding Information Base (LFIB) table providing the downlink port from GTID and MAC or IP address in separate entries, the leaf forwarding engine receiving a CVM packet from a downlink port accompanied by a VLAN_ID, packet destination MAC or IP address, and packet source MAC or IP address of the requesting CVM, the leaf forwarding engine first looking up the GTID from the LTID table with the downlink port and VLAN_ID, thereafter forwarding the packet to the downlink port identified in the LFIB table by GTID and packet destination address (MAC or IP).

A second object of the invention is a plurality of spine switch which receives VxLAN packets from a plurality of leaf switches, the VxLAN packets having a GTID value in a VNID field and encapsulating a CVM VLAN packet, the spine switch having a VxLAN forwarder coupled to a Global Forwarding Information Base (GFIB) table slice associating GTID and CVM VLAN packet destination MAC or IP address to a leaf port, a leaf switch MAC address and a leaf switch IP address, the VxLAN forwarder un-encapsulating the VLAN packet from the VxLAN packet, identifying the leaf port, leaf switch MAC and IP address from the GFIB with the GTID and destination IP or MAC address of the CVM VLAN packet, thereafter re-encapsulating the CVM VLAN packet into a new VxLAN packet with the leaf switch MAC and IP address and forwarding the new VxLAN packet to the identified leaf port.

A third object of the invention is a plurality of spine switches and a plurality of leaf switches, each spine switch having a plurality of leaf ports, each corresponding spine switch leaf port coupled to a leaf switch uplink port, each of the leaf switches also having a plurality of downlink ports, each leaf switch downlink port coupled to a physical server hosting a plurality of Container/Virtual Machines (CVM), each CVM having a local tenant_ID, each leaf switch having a Leaf Tenant IDentifier (LTID) table with a correspondence between downlink port, VLAN_ID, and Global Tenant ID (GTID), each leaf switch also having a Leaf Forwarding Information Base (LFIB) with correspondences between GTID, Layer 2 or Layer 3 address, and downlink port having an associated new MAC address, the spine switch having a slice of a Global Forwarding Information Base (GFIB) with correspondence between GTID, layer 2 or layer 3 address and uplink port along with associated spine switch MAC and IP address, the leaf switch accepting a packet on a downlink port accompanied by a VLAN_ID, using the LTID table to determine a GTID, using the LFIB table to find either a local leaf port for forwarding the packet, or forming a VxLAN packet carrying the GTID and forwarding to one of the corresponding ports of the spine switch according to bits of at least one of: a MAC address, an IP address, or a GTID.

A fourth object of the invention is a leaf switch, the leaf switch having a plurality of downlink ports receiving VLAN packets and a plurality of uplink ports with each one of the uplink ports capable of further subdividing into a plurality of subdivided uplink ports, the leaf switch having a Leaf Tenant IDentifier (LTID) table and a Leaf Forwarding Information Base (LFIB) table coupled to a packet forwarding engine, the LTID table determining a Global Tenant IDentifier (GTID) from the downlink port of the received packet and received packet VLAN_ID from the packet forwarding engine, the packet forwarding engine thereafter looking for a downlink leaf port entry in the LFIB table from the GTID and packet destination address, and if an entry is found, forwarding the packet to that downlink leaf port, and if an entry is not found, forming a VxLAN packet for forwarding to an uplink port, optionally using bits of the address and/or GTID to select one of uplink ports or the subdivided uplink ports to send the packet.

A fifth object of the invention is a spine switch having a Global Forwarding Information Base (GFIB) slice and a VxLAN forwarder receiving VxLAN packets from spine switch leaf ports, the VxLAN forwarder extracting a Global Tenant IDentifier (GTID) from the VxLAN packet, using the GTID and packet destination address to identify a spine switch leaf port and associated leaf switch uplink port MAC/IP address coupled to the spine switch leaf port, modifying the VxLAN packet to use the leaf switch uplink port MAC/IP address coupled to the associated leaf port, and sending the modified VxLAN packet to the spine switch leaf port.

A sixth object of the invention is a plurality of spine switches, each spine switch having a Global Forwarding Information Base (GFIB) slice, each spine switch also having a corresponding uplink port for receiving packets from leaf switches, which have been separated using bits for least one of: a MAC address, an IP address, or a Global Tenant IDentifier (GTID);

each spine switch also having a VxLAN forwarder receiving VxLAN packets from spine switch leaf ports, the VxLAN forwarder extracting a Global Tenant IDentifier (GTID) from the VxLAN packet, using the GTID and destination address to identify a new spine switch leaf port and new leaf switch uplink port MAC/IP address coupled to the spine switch leaf port, modifying the VxLAN packet using the new leaf switch uplink port MAC/IP address for the new leaf port, and sending the modified VxLAN packet to the new leaf port.

SUMMARY OF THE INVENTION

A switch fabric for Container or Virtual Machine (CVM) communications has a plurality of leaf switches, each leaf switch having downlink ports receiving and transmitting VLAN packets to and from CVM processes or other VLAN communication devices, and also having uplink ports receiving and transmitting VxLAN packets to one or more spine switches, each spine switch having a plurality of leaf ports, with each leaf port connecting to a leaf switch uplink port. The plurality of spine switches may also have corresponding ports for handling of packets from leaf switch uplink ports which have been subdivided by at least one of: MAC address bits, IP address bits, or Global Tenant IDentifier (GTID) bits. Each corresponding spine switch leaf port is coupled to a leaf switch uplink port, each leaf switch also having a plurality of downlink ports, each downlink port coupled to a host server having a plurality of CVM processes, each CVM process identified in the host server by a local Tenant ID (LTID) which is typically a unique VLAN_ID for a particular host server.

Each CVM may communicate with other CVMs or outside clients using standard IP packets, including Virtual Local Area Network (VLAN) packets, which have a destination MAC or IP address which is unique to the packet CVM destination address, and a source MAC or IP address which is specific to the CVM packet source address, and a VLAN_ID which is unique to the user or tenant group of both packet destination and source CVMs in their particular host servers. At time of creation of a CVM, the CVM has an associated GTID which is unique from any other GTID.

Each leaf switch has a packet forwarding engine coupled to a Local Tenant IDentifier (LTID) table for associating VLAN_ID and downlink port with a corresponding GTID, and also a Local Forwarding Information Base (LFIB) for converting GTID and CVM address (MAC or IP) to an associated downlink leaf port that can reach the corresponding CVM associated with that GTID. The leaf switch thereby receives VLAN packets from CVMs on leaf switch downlink ports, uses the VLAN_ID and downlink port to search the LTID table for the associated GTID for the CVM, and uses the GTID and CVM packet destination address (MAC or IP) to search the LFIB table for a leaf switch destination downlink port and an optional destination CVM MAC address, modifying the packet with a potentially new VLAN_ID from another lookup of LTID with GTID and the destination downlink port, modifying the packet destination MAC address with destination CVM MAC address and packet source MAC address with leaf switch MAC address, and then sending the VLAN packet to that local leaf switch downlink port associated with the destination CVM. If the leaf switch is unable to associate the GTID and address for the CVM with an LFIB table entry found on one of its own downlink ports (indicating the packet destination CVM is not local to the leaf switch), the packet forwarding engine generates a VxLAN packet by encapsulating the VLAN packet in the VxLAN packet and forwarding the new VxLAN packet to an uplink port for processing by one of the spine switches, selecting an uplink port associated with a particular spine switch using bits from at least one of: destination MAC address, destination IP address, or GTID of the associated CVM. The selection of which method of selecting a respective spine switches for packet processing depends on the switch fabric configuration criteria.

Each Spine switch maintains a separate GFIB table slice associating GTID and CVM MAC or IP address to a leaf port and a leaf switch address (MAC and IP). The GFIB table slice in a spine switch is distinct from the one in other spine switches and the union of the GFIB table slice in all the spine switches forms the complete GFIB table for the switch fabric. Or in other words, the complete GFIB table for the switch fabric is partitioned into multiple distinct GFIB table slices and each distinct GFIB table slice is stored in each one of the spine switches in the fabric. Depending on the switch fabric configuration, the GFIB table can be partitioned based on the CVM MAC address, CVM IP address, CVM Tenant ID or a combination of three. For example, in a switch fabric of 8 spine switches, the GFIB may be partitioned using the least significant 3 bits of CVM MAC address. With this configuration, the GFIB table slice in the spine switch #0 of the switch fabric will contain all the CVM with the lower 3 bits of MAC address equal to "000", spine switch #1 with "001", spine switch #2 with "010", etc.

The spine switch un-encapsulates an incoming VxLAN packet, retrieves the VLAN packet inside the incoming VxLAN packet, looks up into its GFIB table slice with VLAN packet destination address (MAC or IP) and the GTID from the VxLAN VNID field, finds the destination leaf port, destination leaf switch MAC and IP address from the GFIB table slice, and forms a new VxLAN packet using the destination leaf switch MAC/IP address, and forwards the VxLAN packet onto the destination leaf port.

When the VxLAN packet arrives at a leaf switch uplink port, the leaf switch un-encapsulates the incoming VxLAN packet, retrieves the VLAN packet inside the incoming VxLAN packet, looks up into its LFIB table with VLAN packet destination address (MAC or IP) and the GTID from the VxLAN VNID field. Find the leaf destination downlink port and destination CVM MAC address, modify the VLAN packet VLAN_ID with a lookup of LTID using GTID and destination downlink port, for a layer-3 packet modify the VLAN packet destination MAC address to destination CVM MAC address and VLAN packet source address to leaf switch MAC address and forwards the VLAN packet onto the leaf downlink port.

BRIEF DESCRIPTION OF THE DRAWINGS

FIG. 3B shows the Local Tenant IDentifier (LTID) table

FIG. 3C shows the Local Forward Information Base (LFIB) table.

FIG. 4A shows a spine switch process flowchart.

FIG. 4B shows a spine GFIB table.

FIG. 6 shows a block diagram detail view of the leaf switch to spine switch uplink port configuration.

FIG. 7 shows a diagram of a VLAN packet.

FIG. 8 shows a diagram of a VxLAN packet.

DETAILED DESCRIPTION OF THE INVENTION

Figure 1:
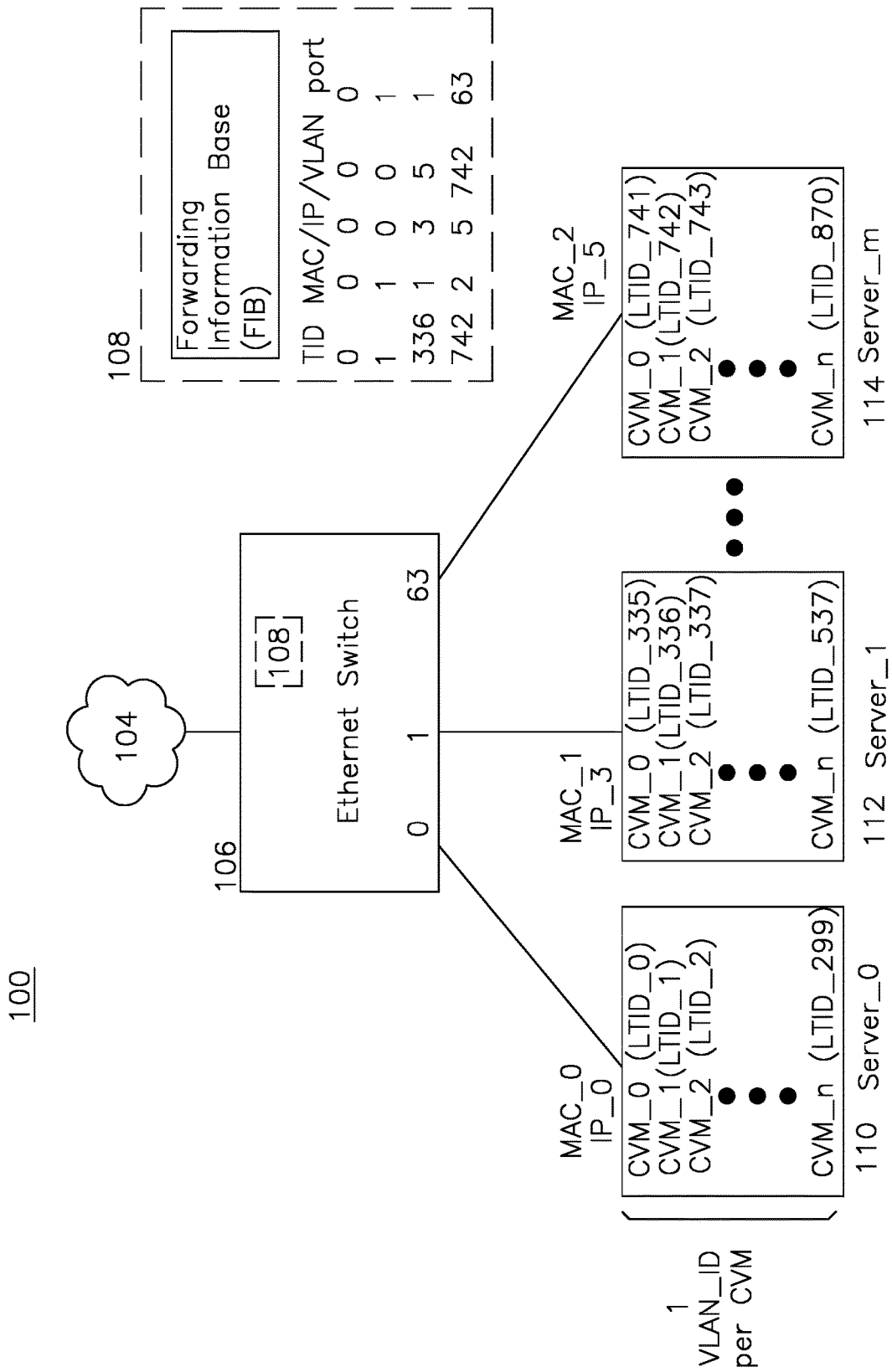
FIG. 1 shows a block diagram for a prior art Virtual machine switch.

Certain terms, elements of the invention, and associated behaviors and constraints are defined as follows:

A physical server is a hardware host computer which is addressable by MAC address or IP address. Each physical server may have a plurality of Container/Virtual Machine (CVM) processes, each CVM process addressable by a unique MAC or IP address. Each Container and/or Virtual Machine (CVM) is an independent but addressable process which may belong to or be assigned to a unique user or tenant group and have input and output which are communicated over a network using MAC address (48 bits), IP address (32 bits or 64 bits), and VLAN_ID which is a 12 bit address value limiting the number of individual user or tenant group a CVM can be assigned in a switch fabric to 4096. However, with the introduction of VxLAN technology, the number of individual user or tenant group a CVM can be assigned in a switch fabric can grow to 16 millions. In the prior art, the basic structure of current switch systems and switch fabrics is not originally designed for handling concurrent communications between such a huge number of CVMs with millions of user or tenant groups. Each CVM is addressable by its MAC address and VLAN_ID in its host server and the link between its host server and the leaf switch but by its MAC address and VxLAN VNID in the fabric between spine switches and leaf switches. Additionally, each CVM can be assigned an IP address, either by static configuration or using some dynamic mechanism such as Dynamic Host Configuration Protocol (DHCP). In the prior art, each fabric is only able to support hundreds of thousands of CVMs because of the design limitation in the switch systems and fabric architecture, whereas the present invention addresses this shortcoming, while providing additional addressing flexibility and freedom in grouping the CVMs to provide different quality of service for different class of cloud data center tenants and applications.

A Tenant is a collection of one or more CVMs, where each CVM is addressable by a MAC and/or IP address and a VLAN_ID in its hosting server or a VxLAN VNID in the switch fabric, i.e., a CVM is accordingly addressed by one of two methods:

a) the CVM MAC address as destination address or alternatively b) the CVM IP address as destination address, Along with a VLAN_ID in its hosting server or VxLAN VNID in the switch fabric.

The CVMs of a tenant may be located on the same physical server, or on different physical servers. Upon creation of a new CVM, the cloud data center operating system software (such as OpenStack) is responsible for assignment of a unique MAC address and a unique IP address to each CVM within the tenant. Each tenant LTID is unique for the particular host server to other tenants (with associated LTID) on that same host server, which provides a unique identification mechanism for information for a particular CVM to reach the particular tenant to which the CVM belongs. In other words, the assignment of LTID to CVMs need be identical only for CVMs on the same server. For example, a tenant A which has a CVM_1 on server 'a' and a CVM_2 also on server 'a' must have the same LTID, whereas a tenant A which has a CVM_1 on server 'a' and a CVM_2 which is on server 'b' may have the same or different LTIDs.

Each CVM has an associated GTID, which is typically assigned by the process which creates the CVM, and the GTID typically persists through the life of the CVM. The present switch fabric provides that access to the CVMs may be distributed through the switch fabric by using bits of at least one of the MAC address, IP address, or GTID. By using a plurality of spine switches 252A, 252B, to 252N of FIG. 2, each spine switch having a corresponding leaf port 259, each corresponding uplink port such as 257 of the leaf switch 220 may provide connectivity to each of the respective leaf port of the spine switches. In one example of the invention, the leaf switch uplink port may be divided into a plurality of sub-ports, each sub-port for connection to a corresponding leaf port of each of a plurality of spine switches. For a large data center with a large number of concurrent CVMs, this approach allows the individual CVMs to continue to use VLAN_ID for local addressing within each server, which preserves the current method in widespread use, while providing scaling to very large numbers of servers, in the example of FIG. 2, 64 servers per leaf switch*64 leaf switches=4096 servers, each capable of 1000 virtual machines, providing 4 million concurrent CVMs. Additionally, the slicing of Forwarding Information Base (FIB) for CVMs (each with a unique GTID and MAC/IP address) such that each spine switch is responsible for a corresponding slice of CVM's GFIB allows a larger table space lookup by distributing the lookup table space over multiple spine switches, and hence allowing a global FIB of 4M CVM to be built from 8 "thin" spine switches in FIG. 2.

An example of a "thin" spine switch is a low cost single rack unit (RU) height switch made with only one single off-the-shelf switch ASIC chip with an internal table memory for 512K CVMs. Furthermore, each leaf switch uplink port can be used with a physical interface which already contains a usable uplink port subdivision, such as the industry standard QSFP28 interface which provides four 25 Gbps electrical interfaces which may be either combined to form a single 100 Gbps interface, or four separate 25 Gbps interfaces for use with four spine switches 252. In one example of the invention, the use of four spine switches in the fabric may be accomplished using the QSFP28 interface at the leaf switch uplink port, which can then be subdivision using a 1 to 4 active optical cable AOC, such as part number FCBN510QE2Cxx manufactured by Finisar (10 Gbps/channel×4 channels) or OPQS28-F-xx-A/SF28/4 by Optech (25 Gbps/channel×4 channels) to direct each of the sub-ports to a corresponding one of four spine switch leaf ports. Alternatively, the use of multiple separate leaf switch uplink ports 257, such as 32 leaf switch uplink ports at each leaf switch allows the leaf switch to be connected to 32 "thin" spine switches 252 simultaneously. With 32 "thin" spine switches in the fabric, the total number of CVMs in the global FIB can now grow to 16 million, which will allow the server to grow its maximum CVM hosting number from 1000 to 4000. By selecting whether to use MAC or IP address for assignment of which spine switch handles certain CVMs it is possible to distribute global FIBs separately across the GFIB table slices of the spine switches by using MAC address bits for selection of which of spine switch 252A to 252N will handle uplink port packets in order to maximize the size of Layer-2 global FIB, or traffic prioritization may be performed using IP subnet address bits (the most significant bits of IP address) to provide quality of service levels depending on IP subnet address. Since the IP address and MAC address of each CVM is also assigned at time of creation of the CVM, this also provides flexibility in the switch fabric architecture and what parameters it may optimize. Because the number of spine switches may vary from 1 to N, for clarity, references to spine switch 252 are understood to mean a single or plurality 252A to 252N for N spine switches, according to the context of use.

In another example of the invention, the selection of which particular leaf switch uplink sub-port is selected relies on a combination of two or more of: IP address, MAC address, or GTID, such as by using a mixture of bits of each. For example, in one example of the invention, it is desired for certain CVMs to receive a higher quality of service than other CVMs, and simultaneously, to provide certain CVM application processes separate route paths through different spine switches, perhaps for security, separating streams by quality of service, or other motivations. In this example, the selection of a sub-port may rely on bits of the CVM destination MAC address or CVM destination IP address as well as bits of the GTID. For 16 spine switches, the subport sub-port assignment may be performed using two GTID bits (where the cloud provider issues GTIDs with the selected bits set to 1 or 0, as well as the assignment of certain applications with an IP or MAC address having particular bits set to 1 or 0 for spine switch subgroup selection, and the other bits assigned for uniqueness, for example. By combining the selected GTID bits and selected IP/MAC address bits used to assign traffic streams to a particular spine switch, the segregation of traffic at time of CVM creation, or thereafter (by changing destination address, for example), a particular performance objective may be accomplished by the assignment of CVM destination address or GTID. The example is provided without limitation to motivation for selecting particular bits to form the particular bits which select the particular leaf switch uplink sub-port.

Figure 2:
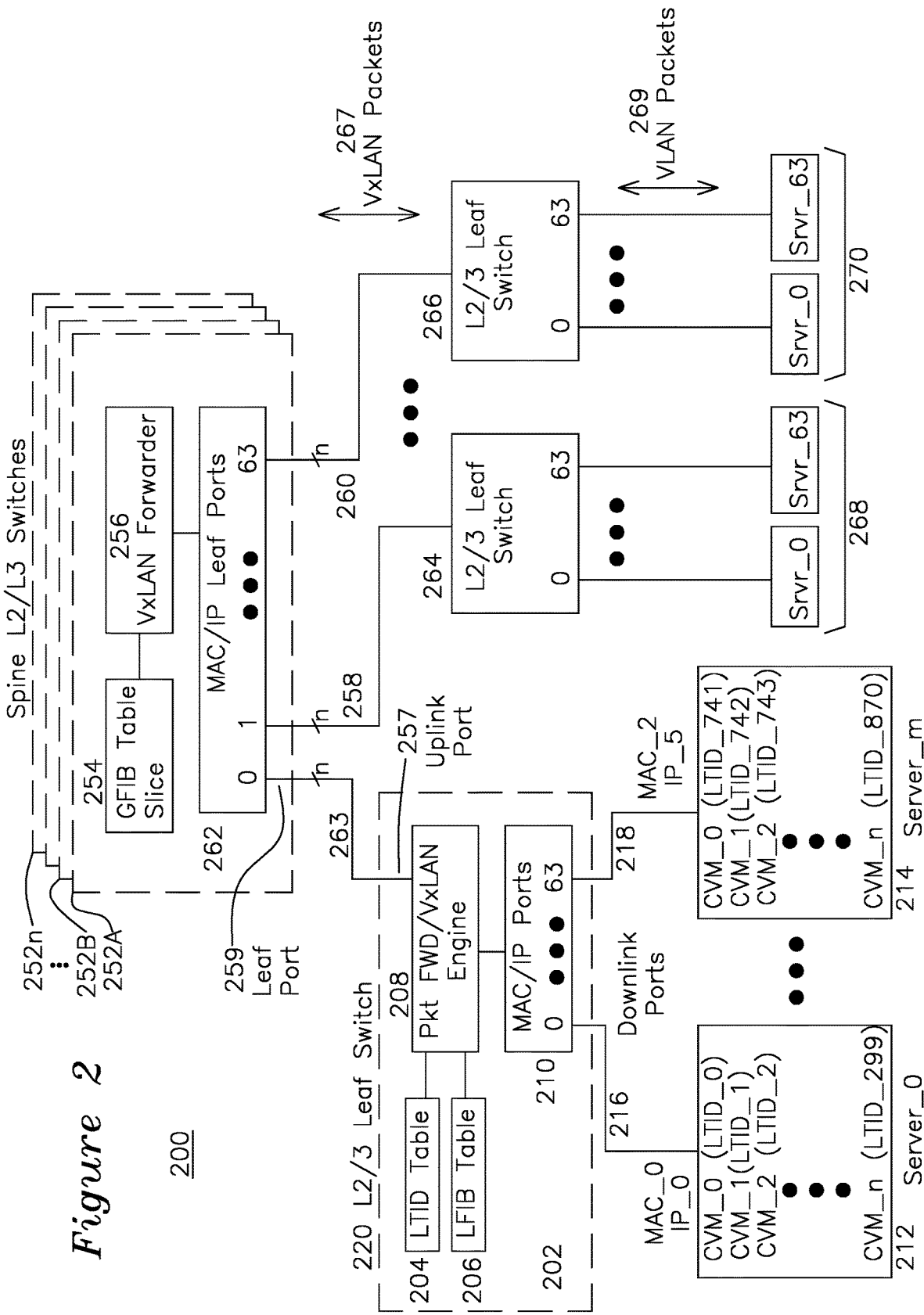
FIG. 2 shows a block diagram for a set of spine switches coupled to a plurality of leaf switches, each leaf switch coupled to a plurality of hosts including servers with CVM processes.

FIG. 2 shows an example switch fabric 200 comprising a plurality of spine switches 252A . . . 252N and a plurality of leaf switches 202, 264, . . . , 266, each of the leaf switches having downlink ports such as 216 . . . 218 of leaf switch 202. Each of the downlink ports 216 . . . 218 is coupled to an associated server such as server_0 212 or server_m 214, and each server hosts a plurality of container or virtual machines (CVM)s as shown for server_0 212 or server_m 214. The plurality of leaf switches 202, 264, . . . , 266 each have respective uplink ports 220, 258, . . . , 260, which are connected to spine switches 252A through 252N. The number of spine switches 252A to 252N may optimally be 2 (for one bit of address/GTID), 4 (2 bits of CVM destination address or GTID), or 8 (3 bits of CVM destination address or GTID), such that which spine switch a packet on a particular uplink port is directed to may be selected by a small number of least or most significant bits of a CVM destination IP address, CVM destination MAC address, or Global Tenant IDentifier. The uplink ports carry VxLAN packets 267, and downlink ports carry VLAN packets 269.

Each leaf switch such as 202 includes a local tenant ID (LTID) table 204 and a Local Forwarding Information Base (LFIB) table 206 which is coupled to a packet forwarding and VxLAN engine 208, which is also coupled to MAC/IP ports 210. The LTID table 204 has a first set of entries providing forward associations from Tenant_id (VLAN_ID) to GTID organized as:

DL_port_n, VLAN_ID→Global Tenant IDentifier (GTID)

and also a set of associations from GTID to VLAN_ID organized as:

DL_port_n, GTID→VLAN_ID where:

DL_port_n references the particular downlink port of the leaf switch which is coupled to the particular server hosting the various CVMs identified by LTID (VLAN_ID), and GTID is a unique global identifier for each tenant assigned by the cloud data center operator. The downlink port may be identified by a unique IP address or unique MAC address, or by a port number, or by any method which provides unique and unambiguous identification of a downlink port for a table entry as known in the prior art.

Each of the leaf switches such as 202 has one or more associated uplink ports 257 which is used for forwarding packets which are not destined to CVMs connected to a leaf switch on its local downlink ports. The uplink ports are used by the leaf switches for sending packets in a VxLAN format to the plurality of spine switches arranged in slices shown as 252A through 252N, where the particular spine switch slice selected is based on bits of a destination address or GTID according to which GFIB slice of the Spine switch is responsible for that particular slice of destination address bits or GTID bits. The selected spine switch receives the VxLAN packets and forwards them to a different leaf switch having the destination CVM on one of its downlink ports. The Spine Switch 252 has a series of leaf ports 262 receiving VxLAN packets from the leaf switches, the leaf ports 262 are coupled to VxLAN forwarder 256, which is coupled to a GFIB table slice 254 containing a subset of all CVMs known to all of the leaf switches. The GFIB table slice 254 provides associations from GTID and MAC or IP address to a leaf port and a leaf switch associated with the particular CVM on one of its downlink ports.

Figure 3A:
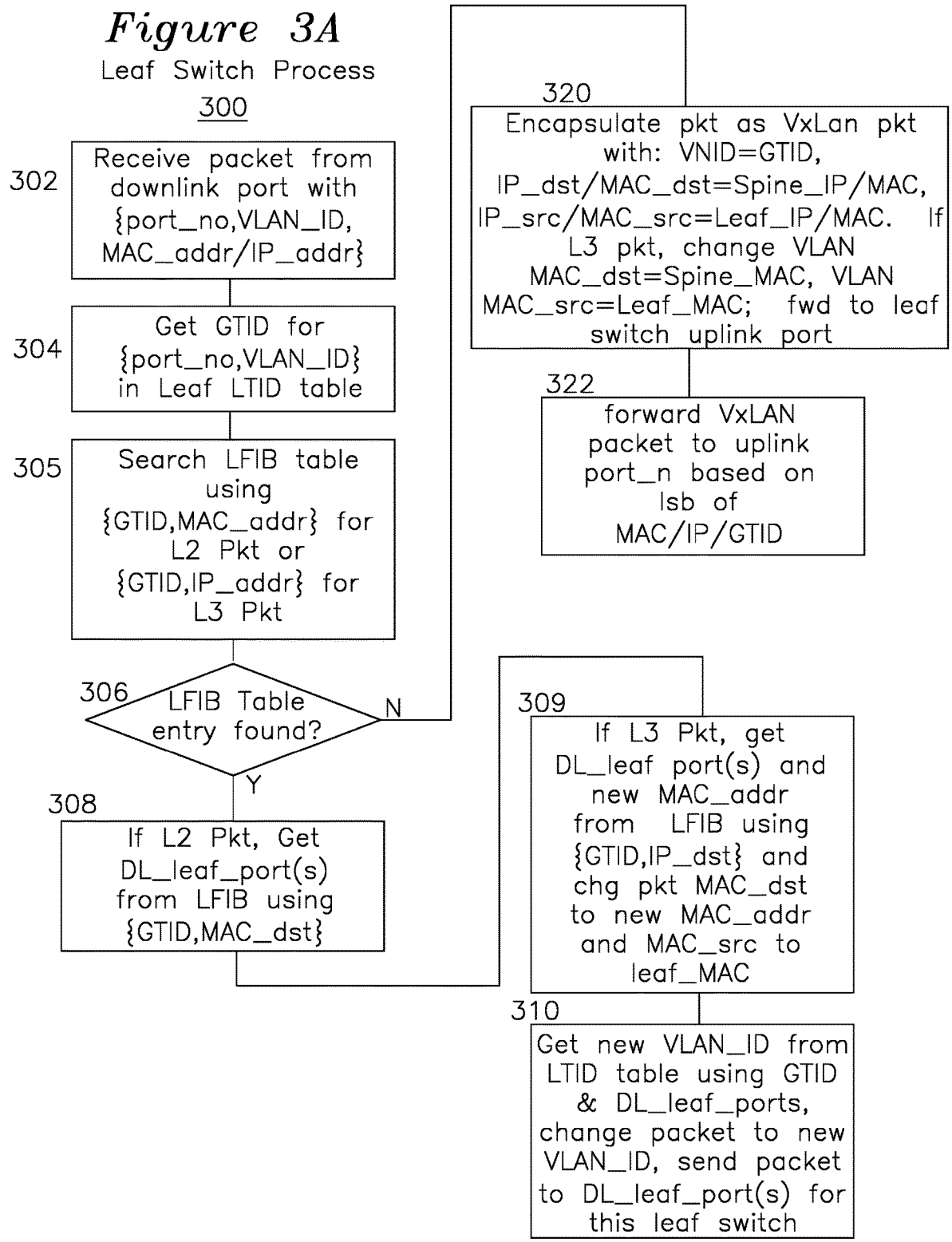
FIG. 3A shows a leaf switch downlink port process flowchart.
Figure 5A:
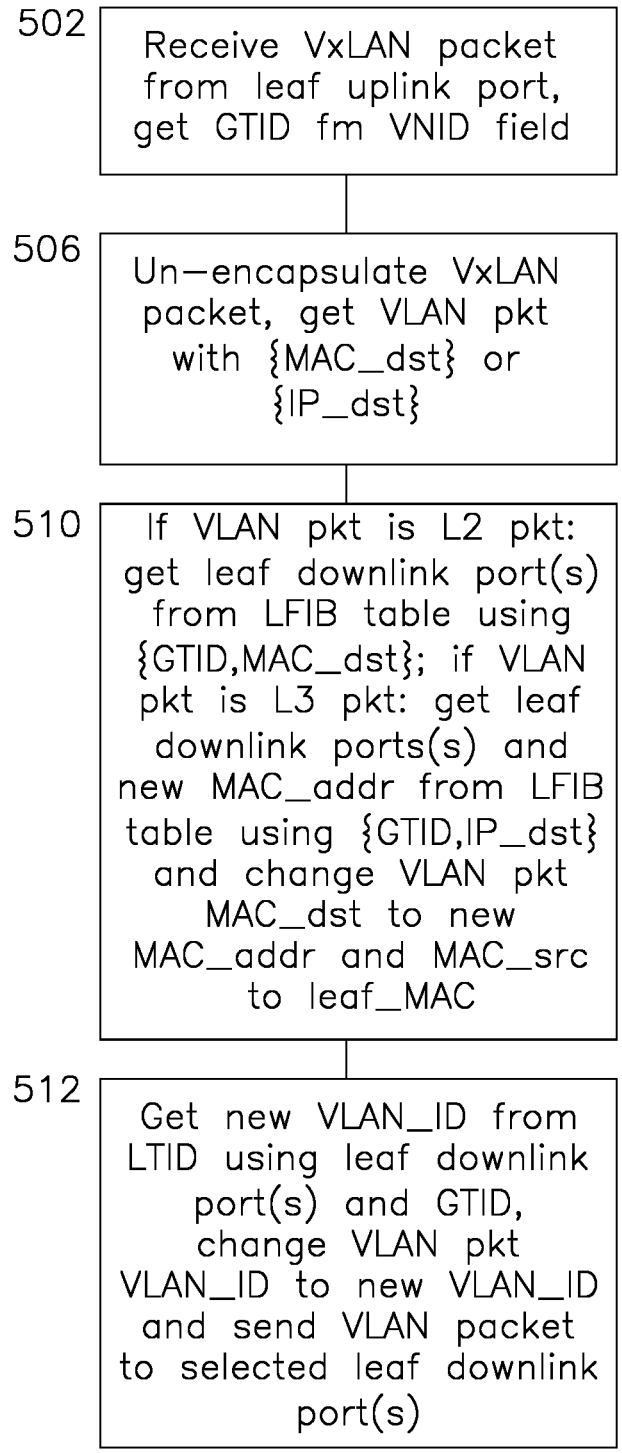
FIG. 5A shows a leaf switch uplink port process flowchart.

The various functions shown in block diagram FIG. 2 are best understood in combination with the flowchart process of FIG. 3A describing the operation of the leaf switch downlink ports, flowchart of FIG. 5A describing the operation of the leaf switch uplink ports, and FIG. 4A describing the operation of the spine switch. Additionally, FIGS. 3B and 3C describe the 204 LTID and 206 LFIB tables, respectively, maintained and used by each leaf switch, and FIG. 4B shows the GFIB table slice 254 used by the spine switch.

The process 300 of FIG. 3A describes the functions performed by the packet forwarding/VxLAN engine 208 of leaf switch 202. CVM packets are received on interface 210 and processed by packet engine 208 in step 302, which extracts the downlink port from the interface port, and the VLAN_ID (local tenant ID associated with the CVM) of the CVM packet as well as the CVM destination MAC/IP address. The engine 208 connects to the LTID table 340 and does a lookup of the GTID from the VLAN_ID and downlink port. If no matching entry is found, the packet is dropped (ignored and not processed any further). In step 305 for a matching entry, the packet forwarding engine 208 uses this GTID and destination MAC address (or destination IP address) of the CVM in the respective LFIB lookup table 352 (or 354), respectively, to lookup the leaf downlink port for the destination CVM, and when a matching entry is found 306, for layer 2 packets, sets the new leaf downlink port from LFIB using {GTID, MAC_dst} in step 308 or for layer 3 packets, sets the new leaf downlink port and gets new MAC from LFIB using {GTID, IP_dst} from the lookup operation of FIG. 3C and changes the packet destination MAC as the new MAC and packet source MAC as the leaf switch MAC in step 309, get new VLAN_ID from LTID table 342 from the new leaf downlink port and GTID, change packet VLAN_ID to new VLAN_ID and sends the packet to the given downlink port in step 310.

If the destination MAC (or IP) address is not found in the LFIB table of FIG. 3C, this is detected in step 306, which results in the VLAN packet being encapsulated into a VxLAN packet in step 320, where if the VLAN packet is a layer-3 packet, the VLAN packet destination MAC address is set to the spine switch MAC address, the VLAN packet source MAC address is set to the leaf switch MAC address, the VxLAN VNID is set to the GTID (Global Tenant ID or VxLAN VNID), the VxLAN IP and MAC source address are set to those of the leaf switch, and the VxLAN IP and MAC destination addresses are set to those of the Spine switch 252, with the VxLAN packet encapsulating the VLAN being sent to the spine switch leaf port 262 where it is processed by the spine switch 252 in step 322.

FIG. 4A describes the process steps performed by the VxLAN forwarder 256 of FIG. 2. The receiving spine switch leaf port of interface 262 transfers the packet to the VxLAN forwarder 256, which examines the GFIB table slice for the GTID value found in the VNID field of the VxLAN packet sent by the leaf switch. FIG. 4A shows the packet received in step 402 and GTID extracted, and un-encapsulated in step 406, which provides the VLAN packet and associated MAC destination address (or IP destination address) which is provided by the VxLAN forwarder 256 to the GFIB table slice 254, which uses the GTID from the VNID field in combination with either the MAC address (of table 442) or IP address (of table 444) in step 410 to extract the associated (spine switch) leaf port and leaf switch MAC address and IP address, which are used to change layer-3 VLAN packets' MAC addresses (with new destination MAC address set to the leaf switch MAC address and new source MAC address set to be the spine switch MAC address) and form the respective destination addresses of a new VxLAN packet which is sent to the selected leaf_port in step 412.

FIG. 5A describes the process 500 for a packet received on a leaf switch uplink port from the spine switch 252 (for the case of a CVM packet switched from a different leaf switch through the spine switch 252 and to the present leaf switch). The VxLAN engine 208 receives the incoming spine switch leaf port packet in step 502, and gets the GTID from the VNID field of the VxLAN packet. In step 506, the VxLAN is un-encapsulated to retrieve the respective MAC or IP destination address of the VLAN packet which was encapsulated, the recovered VxLAN GTID value and VLAN MAC (or IP) address are applied to the FIG. 3C LFIB table, which provides the destination leaf downlink port and destination CVM MAC address for layer-3 packets from table 354 in step 510. In step 512, the VxLAN forwarder 256 retrieves the new VLAN_ID from LTID table 342 using the destination leaf downlink port and GTID, changes the VLAN packet VLAN_ID to the new VLAN_ID, changes the VLAN packet destination MAC to the destination CVM MAC address, changes the VLAN packet source MAC to the leaf switch MAC address, and sends the VLAN packet to the destination spine switch leaf port (coupled to the selected leaf switch uplink port), where the packet is directed to the associated CVM by the selected leaf switch.

FIG. 6 shows additional details on the uplink interface from two leaf switch to the spine switches for the case n=8. Each of the m leaf switches has n uplink ports which are coupled to a respective port of the n spine switches, thereby forming a mesh that allows multiple direct paths from any server connected to any leaf switch to any other server connected to any other leaf switch through one of the spine switches. The architecture of the present invention provides that any number n of spine switches may be connected to each leaf switch, where the fabric may have m leaf switches as shown in FIG. 6 with just two of m leaf switches shown for interconnection clarity. When sizing the switch fabric initially, in one example, it may be useful to first determine the number of spine switches required, by dividing the total number of CVMs to be supported by the available size of the GTID table of each spine switch, and then multiply by a safety factor in the range of 1 to 4 to accommodate for imbalances in traffic paths or number of connections in each spine switch. Each leaf switch uplink port may then be divided into the required number of sub-ports, one for each spine switch. Alternatively, each uplink sub-port may be physically present as a separate uplink port, one for each spine switch as will be discussed for FIG. 6. The particular uplink sub-port selection will be made based on CVM destination address or GTID, as was described. Each uplink port of FIG. 2 (shown in detail in FIG. 6) is arranged with the number of uplink ports n on each leaf switch is the same for all leaf switches. FIG. 6 shows a typical leaf switch 0 220, with associated packet forwarding and VxLAN engine 220 of FIG. 2 coupled to a packet slicer function 602 operative under control of a slice configurator 604, which informs the packet slicer 602 which address to use from the VxLAN packet from 208, typically un-encapsulating the VxLAN packet to extract either the underlying VLAN Layer 2 MAC destination address, the underlying VLAN Layer 3 IP address, or the GTID which is available from the VxLAN packet directly. In the example of FIG. 6 for n=8, the 3 least significant bits (LSB) of the address or GTID are sent to packet slicer 602, with address or GTID ending in binary '000' directed to 252A, '001' directed to 252B, . . . , and '111' directed to 252H. Other bits may be generally used, the LSB example is for understanding the invention only. The slice configuration is a static or dynamic value which may be set up during the switch fabric initialization phase by the cloud operator responsible for generation of the CVMs or this may be done using control plane software which performs the task of reassigning table entries across old and new spine switches. Preferably, the slice configuration may be maintained throughout the operation of the spine switch and reconfigured during a spine switch failure, or by reassignment of CVM paths after addition of additional spine switches, as the leaf switch uplink sub-port assignments also define traffic paths. For example, if a comparatively small number of GTIDs ending in '000' is assigned to high priority traffic, and a comparatively large number of GTIDs ending in '111' is assigned to low priority traffic, switch 252A will be lightly loaded compared to 252H, giving high priority traffic greater throughput. In certain configurations, it may be preferable for the switch fabric to operate with slice configurator selecting lower order bits of the VLAN MAC address (after encapsulation of the VxLAN packet), which may provide a much larger Layer-2 global FIB for layer-2 application focused fabric. Alternatively, the slice configurator 604 may be operative across the fabric to operate on low order bits of the IP destination address of the VLAN packet (CVM IP destination address), which will tend to support a larger number of CVMs with layer-3 based applications. For traffic grooming and selection of certain streams to provide greater quality of service, it may be preferable to segregate traffic across the spine switches using GTID, which is assigned by the process generating the CVM. Example providers which have processes for CVM generation are Amazon Web Services (AWS), and Google Cloud Services.

FIG. 7 shows a packet format for a VLAN packet 702 used on the leaf switch downlink ports, which in the present example is shown as an IEEE 802.11q packet, although other packet types which provide equivalent functionality may be substituted without loss of generality. VLAN packet 702 has a preamble 704 for physical layer data recovery synchronization, and the known layer 2 fields, including L2_dst destination MAC address, L2_src source MAC address, 802.1Q header which includes the VLAN_ID, and a type field. The IP payload part includes IP source and destination addresses, and the packet ends with a frame check sequence (or cyclic redundancy check) CRC/FCS 710 which operates over the entire packet to verify data integrity.

For a layer-2 VLAN packet from a host server to a leaf switch, the L2_source address (L2_src) will contain the packet sourcing CVM MAC address, the L2_destination address (L2_dst) will contain the packet destination CVM MAC address, the VLAN_ID will contain source CVM's local tenant ID, and any data following 706 will be packet payload. Note that the inner layer-2 VLAN packet inside the VxLAN packet will remain unchanged when switched from the source leaf switch to the spine switch and then from the spine switch to the destination leaf switch. On the other hand, for a layer-2 VLAN packet from a leaf switch to a host server, the L2_src, L2_dst and the packet payload will remain unchanged but the VLAN_ID will now be changed to the destination CVM's local tenant ID.

For a layer-3 VLAN packet from a host server to a leaf switch, the L2_src will contain the packet sourcing CVM MAC address, the L2_dst will contain the leaf switch MAC address, the VLAN_ID will still contain source CVM's local tenant ID, and packet payload will now contain the IP_src as the sourcing CVM IP address and IP_dst as the destination CVM IP address. Note that the MAC addresses of the inner layer-3 VLAN packet inside the VxLAN packet from the source leaf switch to the spine switch will be changed as follows: L2_dst to spine switch MAC address and L2_src to source leaf switch MAC address. Similarly, the MAC addresses of the inner layer-3 VLAN packet inside the VxLAN packet from the spine switch to the destination leaf switch will be changed as follows: L2_dst to destination leaf switch MAC address and L2_src to spine switch MAC address. On the other hand, for a layer-3 VLAN packet from a leaf switch to a host server, the L2_src will contain the destination leaf switch MAC address, L2_dst will contain destination CVM MAC address, the VLAN_ID will now be changed to the destination CVM's local tenant ID while the IP_src and IP_dst remain unchanged.

FIG. 8 shows a VxLAN 802 packet as used in leaf to spine communications. An example format is described in the internet engineering technical foundation (ietf.org) RFC7348, which is known as an "encapsulation" format, since the fields of one packet are included in their entirety in another. In the present instance, field 814 of the VxLAN is the extents shown of FIG. 7, which includes the entire VLAN packet of FIG. 7 from layer 2 header 706 to payload 708. The VxLAN frame 802 starts with a preamble 804 as before, followed by its own VxLAN L2 outer MAC header 806 with Vx dst and Vx src fields for layer 2 routing of the VxLAN packet, followed by outer IP header fields 808, which include a protocol type field, header checksum, outer IP source and outer IP destination fields. The outer MAC and outer IP addresses are used for routing of the VxLAN packet between spine switch interface and leaf switch interface of the uplink ports. The Outer IP header 808 is followed by the VxLAN UDP fields 810, and VxLAN header 812, where the VNID field is used to communicate the GTID associated with the VLAN packet 814. The VxLAN packet 802 terminates with the FCS computed over all fields as in FIG. 7.

For a VxLAN packet from a (source) leaf switch to a spine switch, the outer L2_src/IP_src will contain the (source) leaf switch MAC/IP address, while the L2_dst/IP_dst will contain the spine MAC/IP address. On the other hand, for a VxLAN packet from a spine switch to a (destination) leaf switch, the outer L2_src/IP_src will contain the spine switch MAC/IP address, while the L2_dst/IP_dst will contain the (destination) leaf switch MAC/IP address.

Figure 9A:
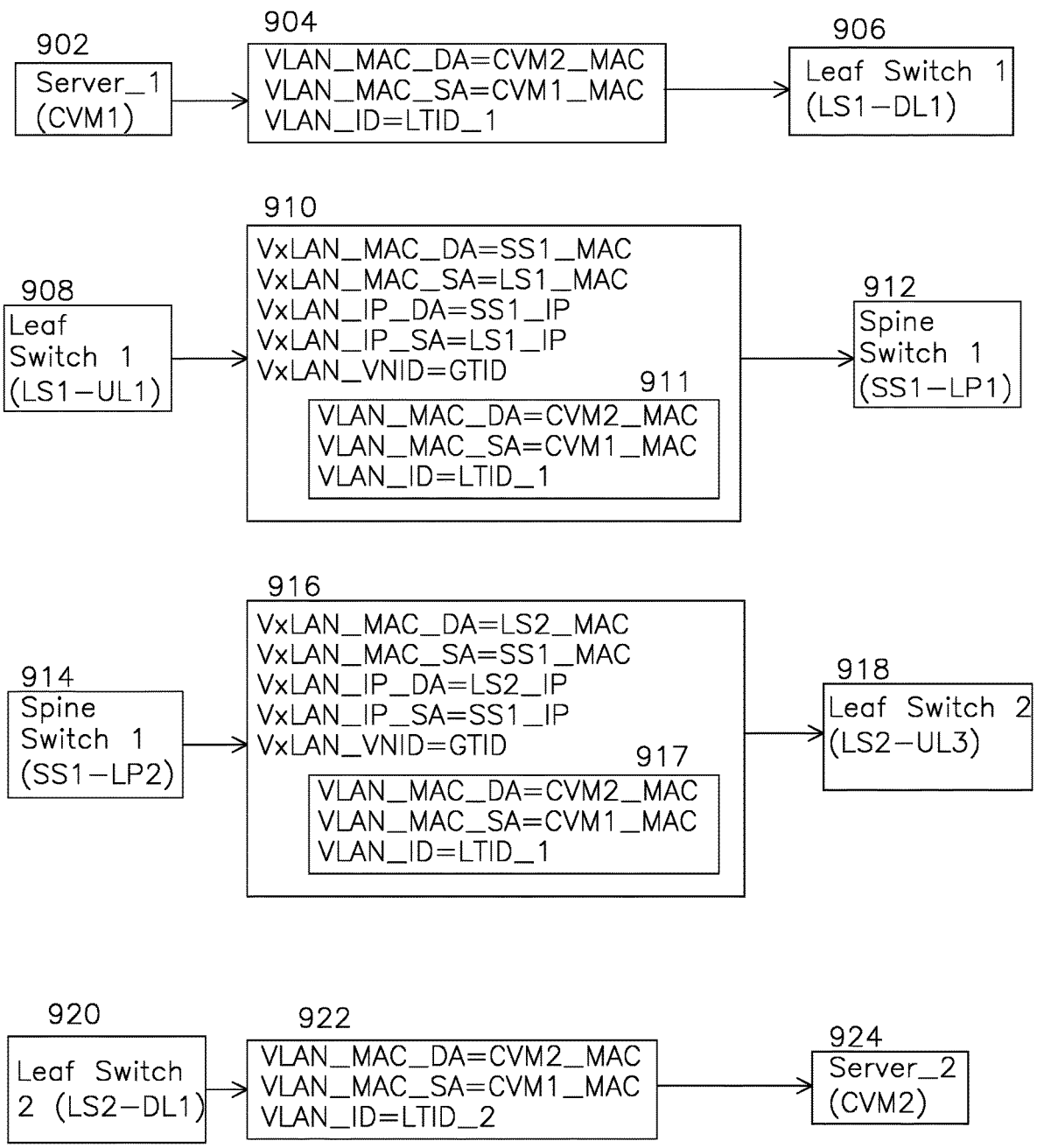
FIG. 9A shows layer 2 packet field modifications when moving through the switch fabric.
Figure 9B:
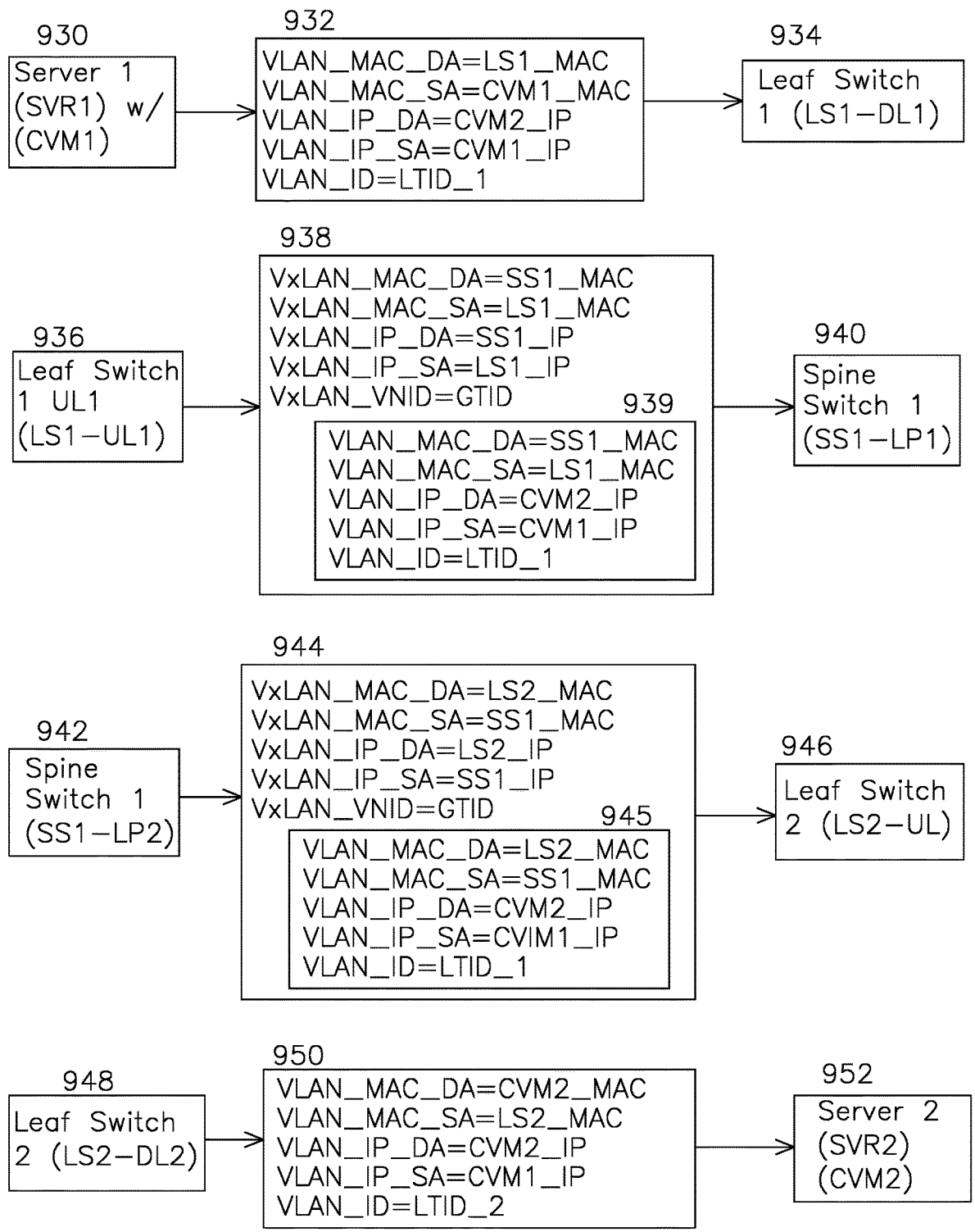
FIG. 9B shows layer 3 packet field modifications when moving through the switch fabric.

FIGS. 9A and 9B shows example packet handling for a layer 2 or layer 3 packet, respectively, from virtual machine CVM1 hosted by server SVR1 (such as CVM_1 of server_0 212 of FIG. 2) to virtual machine CVM2 hosted by a server SVR2 on a different leaf switch (such as a server hosting CVM2 on leaf switch 266 of FIG. 2), requiring a path through one of the spine switches 252. It should be noted that each CVM may have its own unique MAC address and IP address, which is completely independent from the MAC and IP address of the physical server which hosts the CVM process.

FIG. 9A shows server 1 902 which hosts many CVMs, including CVM1 which generates the VLAN packet 904 shown with MAC destination address (VLAN_MAC_DA) set to the MAC address of CVM2 and MAC source address (VLAN_MAC_SA) set to the MAC address of CVM1, and the VLAN_ID set to a local tenant ID value (LTID_1), directing the packet to an associated leaf switch downlink port (LS1_DL1) such as link 216 of FIG. 2. A VxLAN packet 910 is formed and transmitted by the leaf switch 908 uplink port to an associated spine switch 252 leaf port. As was described for detail FIG. 6, each leaf switch uplink port is configurable to multiple sub-ports, allowing the VxLAN packet formed by VxLAN engine 208 to be directed to any of several spine switches 252 based on bits of the destination CVM layer 2 (MAC) address, CVM layer 3 (IP) destination address, or GTID, where the number of spine switches 252A to 252n is determined by the number n of bits of MAC or IP destination address or GTID used, the number of spine switches used equal to $2^n$ based on the n bits of address or GTID used. The VxLAN packet 910 includes inner VLAN packet 911 received from 902, with the VxLAN MAC and IP destination addresses set to those of SS1, respectively, and VxLAN MAC and IP source addresses set to LS1, respectively, as shown. The indication LS1-UL1 908 indicates Leaf Switch 1 uplink port 1, corresponding to Spine switch 1 leaf port 1 of 912. The VxLAN forwarder 262 of the associated spine switch forms packet 916 which is sent from spine switch 1 leaf port 2 914 to example leaf switch 2 uplink port 3 noted in 918. Example leaf switch 2 then sends packet 922 from its downlink port LS2-DL1 to server 2 hosting CVM2 924, with the VLAN engine of the respective leaf switch modifying the de-encapsulated packet 917 with the associated LTID 2 as shown.

FIG. 9B shows the analogous processing where the switch is operating on layer 3 IP addresses. In this example CVM1 hosted by server 1 930 generates packet 932 which is shown with MAC destination address (VLAN_MAC_DA) set to the MAC address of Leaf Switch 1 and MAC source address (VLAN_MAC_SA) set to the MAC address of CVM1, and the VLAN_ID set to a local tenant ID value (LTID_1), but with the added IP destination address (VLAN_IP_DA) set to be the IP address of CVM2 and IP source address (VLAN IP SA) set to be the IP address of CVM1, as shown in the present example, directed to leaf switch downlink port 1 934. The associated leaf switch VxLAN engine of leaf switch 936 forms VxLAN packet 938 containing VLAN packet 939 which is modified from VLAN packet 932 as shown. The associated spine switch 942 next modifies the VxLAN addresses as shown in packet 944 and modifies the VLAN MAC address as shown in packet 945 for delivery to the uplink port of leaf switch 2 (LS2-UL). The leaf switch 2 downlink port 948 delivers packet 950 to server 2 hosting CVM2 of 952. When the packets are Layer 3 IP packets, the encapsulated VLAN source and destination addresses may be rewritten as shown in 939 and 945.

As was described earlier, the leaf switch uplink may be divided into sub-ports using a combination of bits from GTID, IP address, or MAC address. The table below illustrates an example bit mapping where the connections are divided into Premium Tenants, regular tenants, mission critical applications, and best effort applications, according to the separation of CVMs to particular servers and route paths. In the below example, a remapping may also be done such that 4 bits of GTID and address resolve to 8 spine switches rather than 16, such that Premium Tenants and Mission Critical Applications are both directed to spine switches [0 . . . 3] and other traffic routed to spine switches [4 . . . 7].

TABLE 1

| Table Lookup Keys | | | | Lookup Result | |
| --- | --- | --- | --- | --- | --- |
| GTID [23:16] | IP [31:24] | IP [7:0] | MAC [7:0] | Switch Number | Notes |
| 11****** | ******** | ******00 | ******** | 0 | Premium |
| 11****** | ******** | ******01 | ******** | 1 | Tenants |
| 11****** | ******** | ******10 | ******** | 2 | |
| 11****** | ******** | ******11 | ******** | 3 | |
| 10****** | ******** | ******00 | ******** | 4 | Regular |

TABLE 1-continued

| Table Lookup Keys | | | | Lookup Result | |
| --- | --- | --- | --- | --- | --- |
| GTID [23:16] | IP [31:24] | IP [7:0] | MAC [7:0] | Switch Number | Notes |
| 01****** | ******** | ******00 | ******** | 4 | Tenants |
| 00****** | ******** | ******00 | ******** | 4 | |
| 10****** | ******** | ******01 | ******** | 5 | |
| 01****** | ******** | ******01 | ******** | 5 | |
| 00****** | ******** | ******01 | ******** | 5 | |
| 10****** | ******** | ******10 | ******** | 6 | |
| 01****** | ******** | ******10 | ******** | 6 | |
| 00****** | ******** | ******10 | ******** | 6 | |
| 10****** | ******** | ******11 | ******** | 7 | |
| 01****** | ******** | ******11 | ******** | 7 | |
| 00****** | ******** | ******11 | ******** | 7 | |
| . . . . . . | . . . . . . | . . . . . . | . . . . . . | . . . . . . | |
| ******** | 00****11 | ******** | ******00 | 0 | Mission |
| ******** | 00****11 | ******** | ******01 | 1 | Critical |
| ******** | 00****11 | ******** | ******10 | 2 | Applications |
| ******** | 00****11 | ******** | ******11 | 3 | |
| ******** | 00****10 | ******** | ******00 | 4 | Best Effort |
| ******** | 00****01 | ******** | ******00 | 4 | Applications |
| ******** | 00****00 | ******** | ******00 | 4 | |
| ******** | 00****10 | ******** | ******01 | 5 | |
| ******** | 00****01 | ******** | ******01 | 5 | |
| ******** | 00****00 | ******** | ******01 | 5 | |
| ******** | 00****10 | ******** | ******10 | 6 | |
| ******** | 00****01 | ******** | ******10 | 6 | |
| ******** | 00****00 | ******** | ******11 | 6 | |
| ******** | 00****10 | ******** | ******11 | 7 | |
| ******** | 00****01 | ******** | ******11 | 7 | |
| ******** | 00****00 | ******** | ******11 | 7 | |

Packet encapsulation may be generally done, the overall objective of packet encapsulation is to provide a means of transport whereby the original packet to be transported is surrounded by a new header which contains the local routing information (layer 3 such as IP and/or layer 2 such as MAC) source and destination addresses, where the MAC addresses are typically link layer addresses and IP addresses may be one or more hops away. De-encapsulation is then done at the end station to restore the original packet (such as VLAN), along with any other end-station VLAN address modifications.

The VxLAN example was selected to provide understanding of a mechanism to carry the GTID in an easily accessible header field of VxLAN while the VLAN packet was encapsulated in the payload of the VxLAN packet. However, this function may be more generally performed. In another variation of the invention, other encapsulation methods may be substituted for the VxLAN encapsulation, where the encapsulation contains the VLAN packet as described for VxLAN and carries the GTID field in the encapsulation packet header or other readily accessible location. Any alternative encapsulation method may be used which carries the GTID outside the encapsulated packet, including MPLS, which has a 20 bit MPLS label header field which may be used to convey a 20 bit GTID, or other header fields of MPLS may also be used to convey a 24 bit GTID as provided by VxLAN while carrying the encapsulated VLAN packet. Alternatively, a form of transmission using standard VLAN packets in a format called "double-tag VLAN" for distinguishability may be used, where the VLAN tag (which does not have a sufficient number of header VLAN_ID bits) is understood to be transmitted in pairs, the double-tag VLAN packet comprising a first and second VLAN tag, each of which carries parts of a 24 bit GTID, and for which the double-tag VLAN packet MAC, IP and payload remain the same as the VLAN packet to be transmitted. This is given only as an example, as there are many ways of encapsulating VLAN packets beyond VxLAN which accomplish the objects of the invention. Most broadly, it is understood that the minimum communication requirement of encapsulation between the leaf switch uplink port and associated spine switch is to provide a readily accessible GTID field in an encapsulation packet header field with the encapsulated VLAN packet, which is destined for un-encapsulation (extraction of the underlying VLAN packet) and transport as a VLAN packet at a different leaf switch.

In an example of encapsulation using a double-tag VLAN packet, a single VLAN tag (which represents the 12-bit LTID) of an original VLAN packet which originated from a leaf switch downlink from a server sending the original VLAN packet is converted into 2 VLAN tags (which combined together, represent the 24-bit GTID) by the leaf switch which receives it. After conversion to double-tag VLAN packet by the leaf switch, the double-tag VLAN packet is processed thru the spine switch, after which the destination leaf switch will change the double-tag VLAN packet back to the (1-tag) VLAN packet before sending packet to the destination server. If the original VLAN packet is a layer-2 packet, all the other fields in the double-tag VLAN packet will remain the same as the original VLAN packet. If the original VLAN packet is a layer-3 packet, the MAC address of the double-tag VLAN packet will be changed along the way from sourcing server to sourcing leaf, to spine, to destination leaf, and to destination server, in the same manner as the MAC address of the original VLAN packet inside the VxLAN packet would be modified, while the IP address and payload in the double-tag VLAN packet will remain the same as the original VLAN packet. In this variation of encapsulation the mechanism for encapsulation is more efficient than VxLAN previously described. Other encapsulation methods may be used, these are described as examples only.

I claim:

1. A leaf switch for a switch fabric, the leaf switch comprising:
   a plurality of downlink ports for receiving and transmitting Virtual Local Area Network (VLAN) packets;
   an uplink port for receiving and transmitting encapsulated packets;
   a local tenant identifier (LTID) table having entries associating a Virtual Local Area Network IDentifier (VLAN_ID) and downlink port to a Global Tenant IDentifier (GTID);
   a local forwarding information base (LFIB) having entries which provide a downlink port and new MAC address, from a GTID and at least one of a Media Access Controller (MAC) or Internet Protocol (IP) address;
   a packet forwarding engine receiving VLAN packets from the downlink ports and encapsulated packets from the uplink port, the packet forwarding engine coupled to the LTID table and also the LFIB table;
   the leaf packet forwarding engine, upon receiving a VLAN packet having a VLAN_ID and destination address from a downlink port, examining the LTID table to determine whether an entry exists containing a GTID corresponding to the downlink port and VLAN_ID;
   if a matching LTID entry is found, the packet forwarding engine thereafter using the associated GTID with the VLAN packet destination address to examine the LFIB table to determine whether an entry exists containing a downlink port;
   if a matching LFIB entry exists for the GTID and VLAN packet destination address, the packet forwarding engine thereafter changing the VLAN_ID field to a new VLAN_ID selected from an entry in the LTID table matching the GTID and downlink port identified in the LFIB table;
   thereafter forwarding the VLAN packet to the downlink port identified in the LFIB table;
   where the VLAN packet is a layer 3 IP packet and when a matching LFIB entry exists for the GTID and VLAN packet IP destination address with the matching LFIB entry containing a downlink leaf port and new MAC address, the VLAN packet is modified such that:
   the modified VLAN packet has a MAC destination address set to the new MAC address, and the modified VLAN packet has a MAC source address set to a MAC source address of the leaf switch selected downlink port.

2. The leaf switch of claim 1 where, if the LFIB entry does not exist, the packet forwarding engine thereafter forms an encapsulated packet containing the VLAN packet, the encapsulated packet having a header containing the GTID, thereafter forwarding the encapsulated packet to the uplink port.

3. The leaf switch of claim 2 where the encapsulated packet is a Virtual eXtensible Local Area Network (VxLAN) packet containing a Virtual Network IDentifier header (VNID header field) and the GTID value is placed in the VNID header field of the VxLAN packet.

4. The leaf switch of claim 1 where, if the LTID entry does not exist, the packet forwarding engine drops the packet.

5. The leaf switch of claim 1 where, if the VLAN packet is a layer 2 packet, the destination address used to search the LFIB table is a MAC address, and if the VLAN packet is a layer 3 packet, the destination address used to search the LFIB table is an IP address.

6. The leaf switch of claim 1 where, if the packet forwarding engine receives an encapsulated VLAN packet from an uplink port, a GTID field is recovered from a header of the encapsulated packet, and a destination address is recovered from the VLAN packet;
   the forwarding engine searching the LFIB table for an entry indicating a leaf downlink port and optionally a MAC destination address matching the GTID and VLAN packet destination address;
   the forwarding engine determining a new VLAN_ID from an entry in the LTID table matching the leaf downlink port and GTID;
   the forwarding engine forming a modified VLAN packet where the VLAN packet VLAN_ID is replaced with the new VLAN_ID from the LTID table entry associated with the GTID and downlink port, and optionally changing the VLAN destination address to the MAC destination address;
   the forwarding engine sending the modified VLAN packet to the leaf downlink port.

7. The leaf switch of claim 1 where the VLAN packet destination address is a VLAN destination MAC address or a VLAN destination IP address.

8. The leaf switch of claim 1 where the uplink port comprises a plurality of sub-ports, and the packet forwarding engine uses a subset of bits from at least one of: a GTID, a MAC destination address, or an IP destination address to select one of the plurality of uplink sub-ports to forward the encapsulated packet.

9. The leaf switch of claim 8 where the subset of bits is n bits selected from any bit positions of the GTID, the MAC destination address, or the IP destination address, and the number of uplink sub-ports is less than or equal to $2^n$.

10. The leaf switch of claim 8 where the uplink sub-ports receive packets from the packet forwarding engine according to at least one of: a VLAN destination address or a GTID.

11. The leaf switch of claim 8 where the packet forwarding engine selects an uplink sub-port according to at least one of: bits of a VLAN MAC destination address, bits of a VLAN IP destination address, or bits of a GTID.

12. The leaf switch of claim 2 where the encapsulated packet is a VxLAN packet where:
   a VNID field of the VxLAN packet is set to the GTID;
      a MAC source address and an IP source address of the VxLAN packet is set to a leaf switch uplink port MAC address or IP address;
      a MAC destination address and an IP destination address of the VxLAN packet are set to a corresponding MAC address or IP address of the spine switch selected leaf port.

13. A spine switch for a switch fabric, the spine switch receiving Virtual eXtensible Local Area Network (VxLAN) packets and transmitting VxLAN packets in response, the spine switch comprising:
   a plurality of leaf ports receiving and transmitting VxLAN packets;
   a Global Forwarding Information Base (GFIB) table containing an association between a Global Tenant IDentifier (GTID) and a Virtual Local Area Network (VLAN) packet destination Media Access Controller (MAC) MAC address or Internet Protocol (IP) address to a leaf port, a leaf switch MAC address, and a leaf switch IP address;
   a local forwarding information base (LFIB) having entries which provide a downlink port and new MAC address associated with a GTID and at least one of a Media Access Controller (MAC) or Internet Protocol (IP) address;
   a spine switch packet forwarder coupled to the GFIB and to the plurality of leaf ports;
   the spine switch packet forwarder, upon receipt of a Virtual eXtensible Local Area Network (VxLAN) packet having a global tenant identifier (GTID) value in a Virtual Network IDentifier (VNID) header field and also an encapsulated VLAN packet having a destination address:
   un-encapsulating the VLAN packet from the VxLAN packet;
   identifying the leaf port, leaf switch MAC and IP address from a GFIB table entry matching the GTID and destination IP or MAC address of the VLAN packet;
   optionally modifying a MAC destination address and MAC source addresses for a layer 3 VLAN packet, re-encapsulating the VLAN packet into a new VxLAN packet, setting the VxLAN packet destination address to the leaf switch MAC and IP address found in the matching GFIB table entry, and forwarding the re-encapsulated VxLAN packet to the identified leaf port;
   when the VLAN packet is a layer 3 IP packet and a matching LFIB entry exists for the GTID and VLAN packet IP destination address with the matching LFIB entry containing a downlink leaf port and new MAC address, the VLAN packet is modified such that:
      the modified VLAN packet has a MAC destination address set to the new MAC address, and the modified VLAN packet has a MAC source address set to a MAC source address of the leaf switch selected downlink port.

14. The spine switch of claim 13 where the spine switch leaf ports are electrical or optical transceivers.

15. A switch fabric comprising:
   a plurality of leaf switches having downlink ports for receiving and sending Virtual Local Area Network (VLAN) packets from Container Virtual Machine (CVM) processes, and an uplink port for receiving and sending encapsulated packets containing VLAN packets;
   a plurality of spine switches having a plurality of leaf ports, the leaf ports sending and receiving encapsulated packets to and from the uplink ports of a plurality of leaf switches;
   the encapsulated packets having a global tenant identifier (GTID) value in a header field and also encapsulating a VLAN packet having a destination address; each spine switch having:
   a local forwarding information base (LFIB) having entries which provide a downlink port and optionally, new MAC address associated with a GTID and at least one of a Media Access Controller (MAC) or Internet Protocol (IP) address;
   a Global Forwarding Information Base (GFIB) table slice associating GTID and VLAN packet destination MAC or IP address to:
   a leaf port, a leaf switch MAC address and a leaf switch IP address;
   a packet forwarder coupled to the GFIB table slice, the packet forwarder, upon receipt of an encapsulated packet containing a VLAN packet:
   un-encapsulating the VLAN packet, using the GFIB table slice to identify the leaf port, leaf switch MAC and IP address using the GTID and destination IP or MAC address of the VLAN packet;
   re-encapsulating the VLAN packet into a new encapsulated packet with the leaf switch MAC and IP address and forwarding the new encapsulated packet to the identified leaf port;
   where the VLAN packet is a layer 3 IP packet and a matching LFIB entry exists for the GTID and VLAN packet IP destination address with the matching LFIB entry containing a downlink leaf port and new MAC address, the VLAN packet is modified such that:
      the modified VLAN packet has a MAC destination address set to the new MAC address, and the modified VLAN packet has a MAC source address set to a MAC source address of the leaf switch selected downlink port.

16. The switch fabric of claim 15 where each spine switch has a GFIB table with entries having GTID values which are unique from GTID values of other spine switch tables, the GTID entries of a particular spine switch forming the GFIB slice.

17. The switch fabric of claim 16 where each said GFIB slice is based on n bits of at least one of: a GTID, a MAC address, or an IP address associated with the destination address of a CVM.

18. The switch fabric of claim 15 where each of the CVM processes has an associated GTID which is present as a GFIB table entry on only one of the spine switches of the switch fabric.

19. The switch fabric of claim 17 where the n bits are either most significant bits or least significant bits.

20. The switch fabric of claim 15 where the leaf switch uplink port includes a plurality of separate ports for coupling to each of the spine switches.

21. The switch fabric of claim 15 where the leaf switch uplink port includes a plurality of communication links which can either be directed to a single spine switch leaf port or to respective corresponding leaf ports of a plurality of spine switches.

22. The switch fabric of claim 21 where the communication links are either electrical links or optical links.

23. The switch fabric of claim 15 where at least one of the leaf switch downlink ports is coupled to at least one of: a gateway router, a host computer, or a host computer having a plurality of container/virtual machine (CVM) processes, each CVM process having at least one of: a unique MAC address, a unique IP address, or a unique local tenant identifier (LTID).

24. The switch fabric of claim 15 where the encapsulation is a Virtual eXtensible Local Area Network (VxLAN) packet, and the GTID is transmitted using a Virtual Network IDentifier (VNID) header field of the VxLAN packet.

* * * * *